(12) United States Patent
Jan

(10) Patent No.: US 6,285,630 B1
(45) Date of Patent: Sep. 4, 2001

(54) AUTO-CONTROL BIRD-EXPELLING DEVICE

(76) Inventor: Te-Chin Jan, 24F-1, No. 161, Sung-The Rd., Taipei 110 (TW)

( * ) Notice: Subject to any disclaimer, the term of this patent is extended or adjusted under 35 U.S.C. 154(b) by 0 days.

(21) Appl. No.: 09/572,226

(22) Filed: May 17, 2000

(30) Foreign Application Priority Data

Mar. 27, 2000 (TW) .................................................. 89204885

(51) Int. Cl.⁷ .................................................. A01M 29/02
(52) U.S. Cl. .......................................... 367/139; 116/22 A
(58) Field of Search .......................... 367/139; 116/22 A; 43/1

(56) References Cited

U.S. PATENT DOCUMENTS

| 4,658,386 | * | 4/1987 | Morris | 367/139 |
| 4,769,794 | * | 9/1988 | Beuter et al. | 367/139 |
| 5,425,192 | | 6/1995 | Negre . | |
| 5,450,063 | | 9/1995 | Peterson et al. . | |

FOREIGN PATENT DOCUMENTS

| 3625773 C1 | 9/1987 | (DE) . |
| 2 161 974 | 1/1986 | (GB) . |
| 2 166 277 | 4/1986 | (GB) . |
| 2 235 979 | 3/1991 | (GB) . |
| 2-255-217 | 10/1992 | (GB) . |
| 7-313038 | 12/1995 | (JP) . |
| 308797 | 3/1989 | (TW) . |

* cited by examiner

*Primary Examiner*—Ian J. Lobo
(74) *Attorney, Agent, or Firm*—Arent Fox Kintner Plotkin & Kahn, PLLC

(57) ABSTRACT

An auto-control bird-expelling device which functions independently and performs or suspends a bird-expelling operation in response to environmental change is disclosed. The bird-expelling device includes a detector and a bird-expelling signal generator. The detector automatically detects the environmental change, and informs of the bird-expelling signal generator to perform an bird-expelling operation when necessary. The environmental change can be the intrusion of birds into a designated range, and alternatively or additionally, can be the day and night change. On the other hand, the bird-expelling signal can be the sound of a fierce bird such as a hawk or an eagle, or any other visual or audio signals to drive the intruding birds away.

10 Claims, 4 Drawing Sheets

AUTO-CONTROL BIRD-EXPELLING DEVICE

FIELD OF THE INVENTION

The present invention is related to a bird-expelling device, and more particular to an auto-control bird-expelling device which can perform or suspend a bird-expelling operation in response to environmental change.

BACKGROUND OF THE INVENTION

Birds, especially those who eat crops, have been brought troubles to farmers for centuries. The use of a scarecrow is a traditional way to prevent birds from approaching crops. With the development in science and technology, the role of a scarecrow is replaced by an electronic bird-expelling device such as the one disclosed in Huang, Taiwanese Patent Publication No. 308797 filed Nov. 9, 1996, which is incorporated herein for reference. Huang's bird-expelling device has to be manually controlled through a main frame to control the ON/OFF operations of sounding devices which are distributed in the farm and interconnected to the main frame through transmission wires. The sounding devices are stored therein audio data of eagle's sound, and sounding eagle's whistle to scare birds away while being turned ON. Accordingly, complicated transmission wires are needed for interconnecting the sounding devices with the main frame. Further, the continuous eagle sounding not only wastes energy but also results in noise pollution.

SUMMARY OF THE INVENTION

Therefore, an object of the present invention is to provide an auto-control bird-expelling device which functions independently.

Another object of the present invention is to provide an auto-control bird-expelling device which performs or suspends a bird-expelling operation in response to environmental change.

According to a first aspect of the present invention, an auto-control bird-expelling device includes a detector for generating a triggering signal in response to the entrance of a bird into a specified region; and a bird-expelling generator electrically connected to the detector for generating a bird-expelling signal in response to the triggering signal, thereby driving the bird away.

Preferably, the detector is a PIR motion detector which senses heat to determine whether there is something unusual getting into the specified region. By adjusting the position and the orientation of the PIR motion detector, the specified region can be suitably adjusted. For example, the specified region can be a lying cone-shaped region when the PIR motion detector is mounted on a standing pole.

In an embodiment, the bird-expelling signal is a sound of a fierce bird such as a hawk, an eagle or falcon, and the bird-expelling signal generator includes an audio-data storing device for storing audio data of the sound of the fierce bird, and outputting an electric signal indicative of the sound of the fierce bird in response to the triggering signal; an amplifier electrically connected to the audio-data storing device for intensifying a power of the electric signal to output an actuating signal; and a speaker electrically connected to the amplifier for sending out the bird-expelling signal equivalent to the sound of the fierce bird in response to the actuating signal. Alternatively, the bird-expelling device can be any other visual or audio signal as long as the purpose of driving the intruding birds away can be achieved.

Preferably, the auto-control bird-expelling device further includes a volume adjuster electrically connected to the amplifier to adjust a gain of the amplifier so as to control the volume of the sound of the fierce bird.

Preferably, the auto-control bird-expelling device further includes a switch electrically connected to the bird-expelling signal generator for providing a user to optionally disable the detector, and the bird-expelling signal generator generates the bird-expelling signal at a predetermined interval when the detector is disabled; and a time-interval adjuster electrically connected to the bird-expelling signal generator for providing a user to optionally adjust the predetermined interval.

Preferably, the auto-control bird-expelling device further includes a first photo-sensing device electrically connected to the bird-expelling signal generator for disabling the bird-expelling signal generator when the detector is disabled and an intensity of the environmental light is lower than a threshold value. The first photo-sensing device can be the one including a CDS photo-sensitive resistor.

Preferably, the auto-control bird-expelling device further includes a second photo-sensing device electrically connected to the detector for disabling the detector when an intensity of the environmental light is lower than a threshold value. The second photo-sensing device can be the one including a CDS photo-sensitive resistor.

According to a second aspect of the present invention, an auto-control bird-expelling device includes a bird-expelling signal generator for generating a bird-expelling signal to drive a bird away; and a first photo-sensing device electrically connected to the bird-expelling signal generator for generating a disabling signal to disable the bird-expelling signal generator when an intensity of the environmental light is lower than a threshold value.

Preferably, the auto-control bird-expelling device further includes a controller electrically connected to the bird-expelling signal generator to have the bird-expelling signal generator generate the bird-expelling signal at a predetermined interval. The controller preferably includes a time-interval adjuster electrically connected to the bird-expelling signal generator for providing a user to optionally adjust the predetermined interval.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
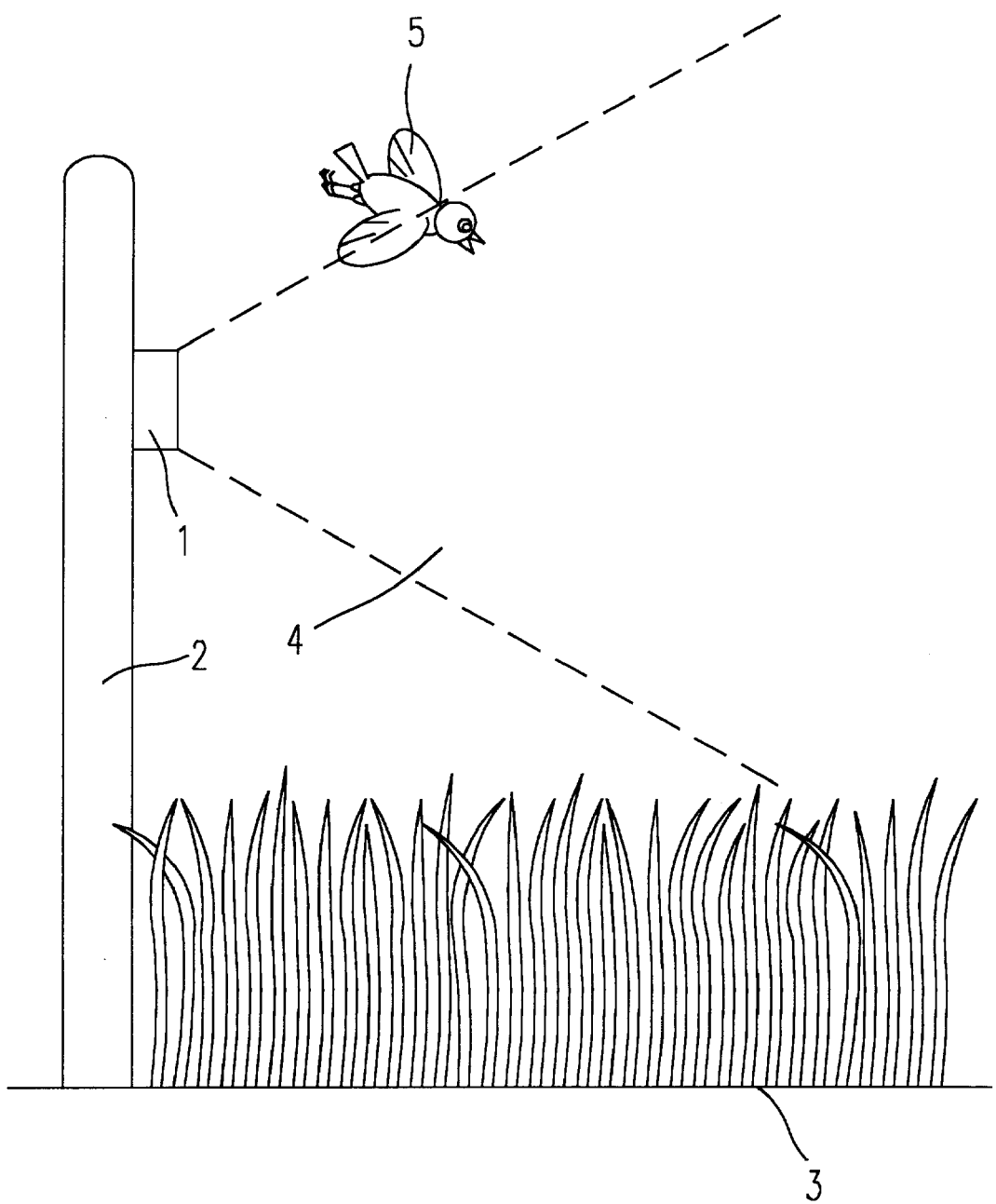
FIG. 1 is a schematic diagram showing an application of a bird-expelling device according to the present invention in a farm.

Please refer to FIG. 1 which is a schematic diagram showing an application of a bird-expelling device according to the present invention in a farm. In order to prevent birds from flying into the farm 3 to harm the crops, one or more bird-expelling devices 1 are suitably arranged in the farm 3. For example, the bird-expelling device(s) can be mounted on a standing pole 2. For each bird-expelling device 1, a specified region 4 is covered to forbid the approach of birds. When a bird 5 intrudes the specified region 4, the bird-expelling device 1 will send out a visual or audio signal to scare the bird 5 away. Generally, the bird-expelling signal is the sound of a fierce bird such as a hawk, an eagle or a falcon.

On the other hand, most birds rest at night, so it is preferred that the bird-expelling device only works at day so as not to waste energy and make noise at night.

Sometimes, birds are so many that the bird-expelling device 1 sounds all the time so as to be somewhat noisy. Therefore, it is preferred that the bird-expelling device 1 can be optionally changed to sound at a predetermined interval rather than sound whenever a bird enters the specified region 4.

In order to achieve the above purposes, a preferred embodiment of an auto-control bird-expelling device is illustrated as follows with reference to FIG. 2 which is a block circuit diagram schematically showing a preferred embodiment of a bird-expelling device according to the present invention. As shown, the bird-expelling device includes a detector 11, a bird-expelling signal generator 12, a controller 13 and a switch 14. The detector 11 includes a photo-sensing device 111. The bird-expelling signal generator 12 includes an audio-data storing device 121, an amplifier 122, a speaker 123, and a volume controller 1221. The controller 13 includes a photo-sensing device 131 and a time-interval adjuster 132.

When the switch 14 is set to perform a bird-detection mode, the detector 11 will monitor the specified region 4 (FIG. 1), and generate a triggering signal in response to the entrance of a bird into the specified region 4. Whenever the bird-expelling signal generator 12 receives the triggering signal, the audio-data storing device 121 storing therein audio data of the eagle's sound outputs an electric signal indicative of the eagle's sound. The electric signal is amplified by the amplifier 122 to become an actuating signal. In response to the actuating signal, the speaker 123 sounds the eagle's whistle. Before or during the sounding period, the volume of the sound can be controlled by the volume adjuster 1221 by adjusting the gain of the amplifier 122. When the sky becomes dark and the intensity of the environmental light detected by the photo-sensing device 111 is lower than a threshold value, it is considered to be night and the detector 111 is disabled. When the intensity of the environmental light detected by the photo-sensing device 111 is higher than the threshold value, the detector 11 will be enabled again.

When the switch 14 is set to perform an intermittently sounding mode, the detector 11 is kept disabled. The controller 13 takes over the function of the bird-expelling signal generator 12. First of all, a sounding interval is predetermined in the time interval adjuster 132, and then the audio-data storing device 121 storing therein audio data of the eagle's sound outputs an electric signal indicative of the eagle's sound at the predetermined interval. The electric signal is amplified by the amplifier 122 to become an actuating signal. In response to the actuating signal, the speaker 123 sounds the eagle's whistle. Before or during the sounding period, the volume of the sound can be controlled by the volume adjuster 1221 by adjusting the gain of the amplifier 122. When the sky becomes dark and the intensity of the environmental light detected by the photo-sensing device 131 is lower than a threshold value, it is considered to be night and the bird-expelling signal generator 12 is disabled. When the intensity of the environmental light detected by the photo-sensing device 131 is higher than the threshold value, the bird-expelling signal generator 12 will be enabled again.

Of course, the user can switch the bird-expelling device between the bird-detection mode and intermittently sounding mode at any time.

Figure 2:
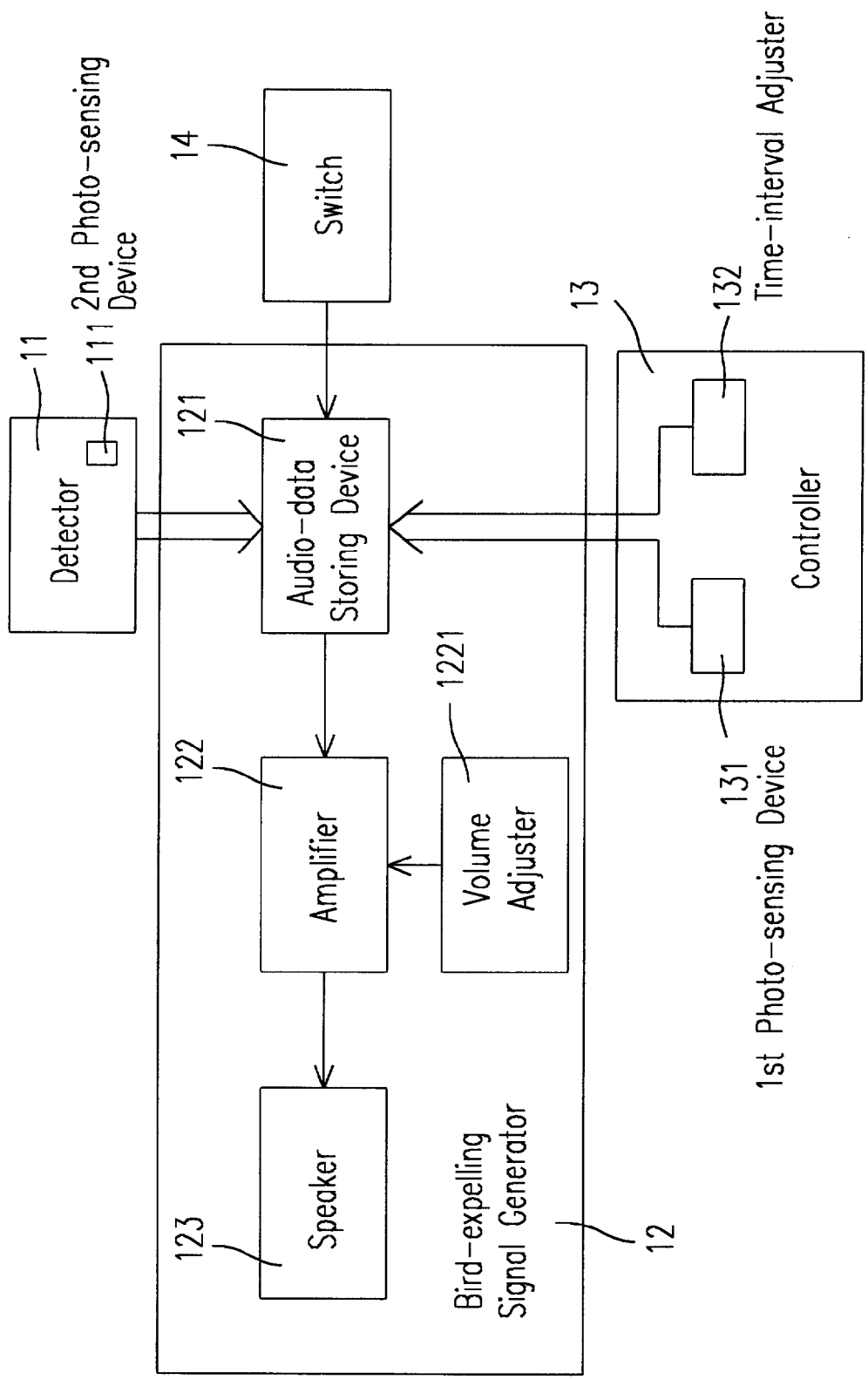
FIG. 2 is a block circuit diagram schematically showing a preferred embodiment of a bird-expelling device according to the present invention.
Figure 3:
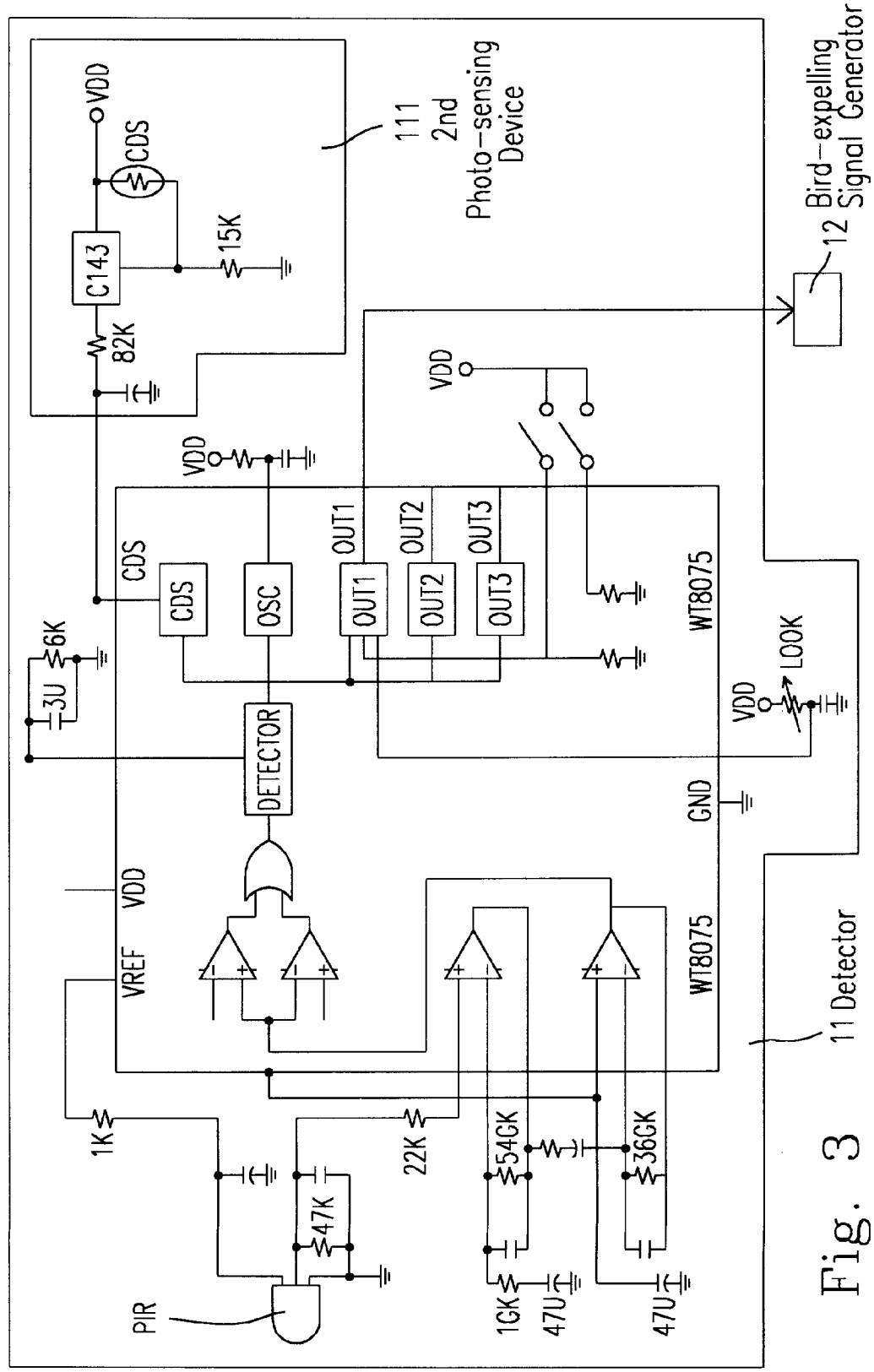
FIG. 3 is a schematic circuit diagram showing the detector of FIG. 2.
Figure 4:
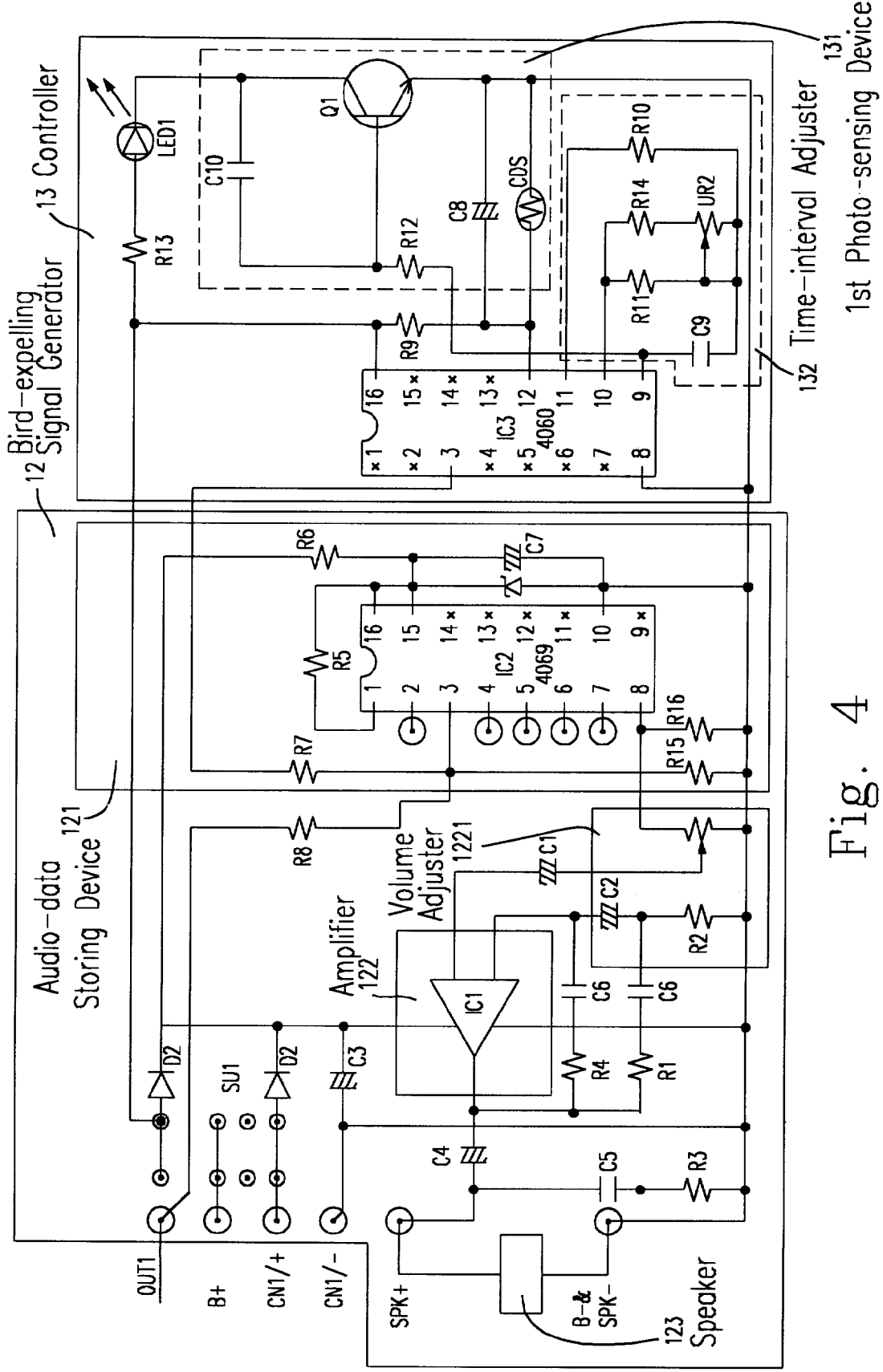
FIG. 4 is a schematic circuit diagram showing the bird-expelling signal generator and the controller of FIG. 2.

Examples of the circuitry for the detector 11, the bird-expelling signal generator 12, and the controller 13 are referred to FIGS. 2 and 3 which are provided only for easy understanding rather than limiting the present invention thereto. As shown, the detector 11 is a PIR (passive infrared) motion detector, and each of the photo-sensing device 111 and 131 includes a CDS photo-sensitive resistor.

It is understood that the bird-expelling device mentioned as above, for example, can also be used as a security alarm by mounting the bird-expelling device at a suitable site, adjusting the specified region to a suitable range, changing the sound to any other suitable vision or audio signal, and/or making the bird-expelling device sound at night rather than at day.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similarstructures.

What is claimed is:

1. An auto-control bird-expelling device, comprising:
    a detector for generating a triggering signal in response to the entrance of a bird into a specified region;
    a bird-expelling signal generator electrically connected to said detector for generating a bird-expelling signal in response to said triggering signal, thereby driving said bird away;
    a switch electrically connected to said bird-expelling signal generator for providing a user to optionally disable said detector, and said bird-expelling signal generator generates said bird-expelling signal at a predetermined interval when said detector is disabled; and
    a time-interval adjuster electrically connected to said bird-expelling signal generator for providing a user to optionally adjust said predetermined interval.

2. The auto-control bird-expelling device according to claim 1 wherein said detector is a PIR motion detector which senses heat to determine whether there is something unusual getting into said specified region.

3. The auto-control bird-expelling device according to claim 1 wherein said bird-expelling signal is a sound of a fierce bird, and said bird-expelling signal generator includes:
    an audio-data storing device for storing audio data of said sound of said fierce bird, and outputting an electric signal indicative of said sound of said fierce bird in response to said triggering signal;
    an amplifier electrically connected to said audio-data storing device for intensifying a power of said electric signal to output an actuating signal; and a speaker electrically connected to said amplifier for sending out said bird-expelling signal equivalent to said sound of said fierce bird in response to said actuating signal.

4. The auto-control bird-expelling device according to claim 3 further comprising a volume adjuster electrically connected to said amplifier to adjust a gain of said amplifier so as to control the volume of said sound of said fierce bird.

5. The auto-control bird-expelling device according to claim 1 further comprising a photo-sensing device electrically connected to said detector for disabling said detector when an intensity of the environmental light is lower than a threshold value.

6. The auto-control bird-expelling device according to claim 5 wherein said photo-sensing device includes a CDS photo-sensitive resistor.

7. The auto-control bird-expelling device according to claim 1 wherein said detector is mounted on a standing pole, and said specified region includes a lying cone-shaped region.

8. An auto-control bird-expelling device, comprising:

a bird-expelling signal generator for generating a bird-expelling signal to drive a bird away;

a first photo-sensing device electrically connected to said bird-expelling signal generator for generating a disabling signal to disable said bird-expelling signal generator when an intensity of the environmental light is lower than a threshold value;

a controller electrically connected to said bird-expelling signal generator to have said bird-expelling signal generator generate said bird-expelling signal at a predetermined interval; and a time-interval adjuster electrically connected to said bird-expelling signal generator for providing a user to optionally adjust said predetermined interval.

9. The auto-control bird-expelling device according to claim 8 wherein said bird-expelling signal is a sound of a fierce bird, and said bird-expelling signal generator includes:

an audio-data storing device for storing audio data of said sound of said fierce bird, and outputting an electric signal indicative of said sound of said fierce bird at said predetermined interval;

an amplifier electrically connected to said audio-data storing device for intensifying a power of said electric signal to output an actuating signal; and a speaker electrically connected to said amplifier for sending out said bird-expelling signal equivalent to said sound of said fierce bird in response to said actuating signal.

10. The auto-control bird-expelling device according to claim 9 further comprising a volume adjuster electrically connected to said amplifier to adjust a gain of said amplifier so as to control the volume of said sound of said fierce bird.

* * * * *